(12) United States Patent
Holderman et al.

(10) Patent No.: US 12,421,823 B2
(45) Date of Patent: Sep. 23, 2025

(54) VALVE INCLUDING AN EXPANDABLE METAL SEAL

(71) Applicant: Halliburton Energy Services, Inc., Houston, TX (US)

(72) Inventors: Luke William Holderman, Singapore (SG); Brandon Thomas Least, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/338,538

(22) Filed: Jun. 21, 2023

(65) Prior Publication Data

US 2023/0332478 A1    Oct. 19, 2023

Related U.S. Application Data

(63) Continuation of application No. 17/395,958, filed on Aug. 6, 2021, now abandoned.
(Continued)

(51) Int. Cl.
 *E21B 33/12* (2006.01)
 *E21B 33/128* (2006.01)
(Continued)

(52) U.S. Cl.
 CPC ...... *E21B 33/1208* (2013.01); *E21B 33/1285* (2013.01); *E21B 33/14* (2013.01);
(Continued)

(58) Field of Classification Search
 CPC .. E21B 33/1208; E21B 33/1285; E21B 33/14; E21B 33/16; E21B 34/14;
(Continued)

(56) References Cited

U.S. PATENT DOCUMENTS 1,525,740 A   2/1925 Howard
2,075,912 A   4/1937 Roye
(Continued)

FOREIGN PATENT DOCUMENTS

CA    2820742 A1    9/2013
CN    203308412 U   11/2013
(Continued)

OTHER PUBLICATIONS

Fripp, M., et al., "Degradable Metal for Use in a Fully Dissolvable Frac Plug," Offshore Technology Conference, OTC-27187-MS, May 2-5, 2016, 9 pages.

*Primary Examiner* — Steven A MacDonald
(74) *Attorney, Agent, or Firm* — Scott Richardson; Parker Justiss, P.C.

(57) ABSTRACT

Provided, in at least one aspect, is a valve, a method for sealing, and a related well system. The valve, in one aspect, includes a housing, and a sliding sleeve disposed in the housing and defining an annular flow path between the sliding sleeve and the housing, the sliding sleeve configured to move from a closed positioned closing the annular flow path to an open position opening the flow path. The valve, in at least one other aspect, further includes a plug member positioned within the annular flow path, the plug member comprising a metal configured to expand in response to hydrolysis to seal the annular flow path.

24 Claims, 9 Drawing Sheets

Related U.S. Application Data

(60) Provisional application No. 63/065,248, filed on Aug. 13, 2020.

(51) Int. Cl.
*E21B 33/14* (2006.01)
*E21B 33/16* (2006.01)
*E21B 34/14* (2006.01)
*F16K 3/02* (2006.01)
*F16K 3/26* (2006.01)

(52) U.S. Cl.
CPC ............. *E21B 33/16* (2013.01); *E21B 34/14* (2013.01); *F16K 3/0236* (2013.01); *F16K 3/265* (2013.01); *E21B 2200/01* (2020.05); *E21B 2200/06* (2020.05)

(58) Field of Classification Search
CPC ............. E21B 2200/01; E21B 2200/06; E21B 33/1212; E21B 33/165; F16K 3/0236; F16K 3/265
See application file for complete search history.

(56) References Cited

U.S. PATENT DOCUMENTS

| | | |
|---|---|---|
| 2,590,931 A | 4/1952 | Cabaniss |
| 2,743,781 A | 5/1956 | Lane |
| 2,865,454 A | 12/1958 | Richards |
| 3,206,536 A | 9/1965 | Goodloe |
| 3,371,716 A | 3/1968 | Current |
| 3,616,354 A | 10/1971 | Russell |
| 3,706,125 A | 12/1972 | Hopkins |
| 4,270,608 A | 6/1981 | Hendrickson |
| 4,424,859 A | 1/1984 | Sims |
| 4,424,861 A | 1/1984 | Carter |
| 4,442,908 A | 4/1984 | Steenbock |
| 4,446,932 A | 5/1984 | Hipp |
| 4,457,379 A | 7/1984 | McStravick |
| 4,527,815 A | 7/1985 | Frick |
| 4,977,636 A | 12/1990 | King |
| 4,979,585 A | 12/1990 | Chesnutt |
| 5,139,274 A | 8/1992 | Oseman |
| 5,220,959 A | 6/1993 | Vance |
| 5,424,139 A | 6/1995 | Shuler |
| 5,492,173 A | 2/1996 | Kilgore |
| 5,517,981 A | 5/1996 | Taub et al. |
| 5,662,341 A | 9/1997 | Ezell et al. |
| 5,667,015 A | 9/1997 | Harestad |
| 5,803,173 A | 9/1998 | Fraser et al. |
| 6,089,320 A | 7/2000 | LaGrange |
| 6,106,024 A | 8/2000 | Herman et al. |
| 6,840,325 B2 | 1/2005 | Stephenson |
| 6,907,930 B2 | 6/2005 | Cavender |
| 6,942,039 B2 | 9/2005 | Tinker |
| 7,104,322 B2 | 9/2006 | Whanger et al. |
| 7,152,687 B2 | 12/2006 | Gano |
| 7,322,408 B2 | 1/2008 | Howlett |
| 7,347,274 B2 | 3/2008 | Patel |
| 7,350,590 B2 | 4/2008 | Hosie et al. |
| 7,373,688 B2 | 5/2008 | Aoyama et al. |
| 7,402,277 B2 | 7/2008 | Ayer |
| 7,578,043 B2 | 8/2009 | Simpson et al. |
| 7,673,688 B1 | 3/2010 | Jones |
| 7,677,303 B2 | 3/2010 | Coronado |
| 7,696,275 B2 | 4/2010 | Slay et al. |
| 7,963,321 B2 | 6/2011 | Kutac |
| 7,996,945 B2 | 8/2011 | Nosker |
| 8,042,841 B2 | 10/2011 | Viegener |
| 8,109,339 B2 | 2/2012 | Xu |
| 8,225,861 B2 | 7/2012 | Foster et al. |
| 8,266,751 B2 | 9/2012 | He |
| 8,430,176 B2 | 4/2013 | Xu |
| 8,453,736 B2 | 6/2013 | Constantine |
| 8,459,367 B2 | 6/2013 | Nutley et al. |
| 8,469,084 B2 | 6/2013 | Clark et al. |
| 8,490,707 B2 | 7/2013 | Robisson |
| 8,579,024 B2 | 11/2013 | Mailand et al. |
| 8,684,096 B2 | 4/2014 | Harris |
| 8,794,330 B2 | 8/2014 | Stout |
| 8,807,209 B2 | 8/2014 | King |
| 8,875,800 B2 | 11/2014 | Wood et al. |
| 8,894,070 B2 | 11/2014 | Bhat et al. |
| 8,993,491 B2 | 3/2015 | James |
| 9,004,173 B2 | 4/2015 | Richard |
| 9,217,311 B2 | 12/2015 | Slup |
| 9,249,904 B2 | 2/2016 | Duquette |
| 9,279,295 B2 | 3/2016 | Williamson et al. |
| 9,347,272 B2 | 5/2016 | Hewson et al. |
| 9,353,606 B2 | 5/2016 | Bruce et al. |
| 9,393,601 B2 | 7/2016 | Ranck |
| 9,404,030 B2 | 8/2016 | Mazyar |
| 9,534,460 B2 | 1/2017 | Watson et al. |
| 9,611,715 B1 | 4/2017 | Smith |
| 9,644,459 B2 | 5/2017 | Themig |
| 9,708,880 B2 | 7/2017 | Solhaug |
| 9,725,979 B2 | 8/2017 | Mazyar et al. |
| 9,732,578 B2 | 8/2017 | McRobb |
| 9,745,451 B2 | 8/2017 | Zhao et al. |
| 9,765,595 B2 | 9/2017 | Themig et al. |
| 9,771,510 B2 | 9/2017 | James et al. |
| 9,945,190 B2 | 4/2018 | Crowley |
| 9,976,380 B2 | 5/2018 | Davis et al. |
| 9,976,381 B2 | 5/2018 | Martin et al. |
| 10,030,467 B2 | 7/2018 | Al-Gouhi |
| 10,060,225 B2 | 8/2018 | Wolf |
| 10,119,011 B2 | 11/2018 | Zhao et al. |
| 10,179,873 B1 | 1/2019 | Meng |
| 10,316,601 B2 | 6/2019 | Walton et al. |
| 10,337,298 B2 | 7/2019 | Braddick |
| 10,344,570 B2 | 7/2019 | Steele |
| 10,352,109 B2 | 7/2019 | Sanchez |
| 10,364,636 B2 | 7/2019 | Davis |
| 10,472,933 B2 | 11/2019 | Steele |
| 10,533,392 B2 | 1/2020 | Walton et al. |
| 10,648,285 B2 * | 5/2020 | Gaudette ................. E21B 43/08 |
| 10,718,183 B2 | 7/2020 | Bruce et al. |
| 10,758,974 B2 | 9/2020 | Sherman |
| 10,794,152 B2 | 10/2020 | Lang et al. |
| 10,961,804 B1 | 3/2021 | Fripp |
| 11,359,448 B2 | 6/2022 | Fripp |
| 11,365,611 B2 | 6/2022 | Gibb |
| 11,428,066 B2 | 8/2022 | Andersen |
| 11,512,552 B2 | 11/2022 | Fripp |
| 2002/0088616 A1 | 7/2002 | Swor et al. |
| 2003/0132001 A1 * | 7/2003 | Wilson ................. E21B 34/14 |
| | | 137/315.07 |
| 2003/0164236 A1 | 9/2003 | Thornton |
| 2003/0164237 A1 | 9/2003 | Butterfield, Jr. |
| 2003/0205377 A1 | 11/2003 | Streater |
| 2004/0194970 A1 | 10/2004 | Eatwell |
| 2005/0051333 A1 * | 3/2005 | Weber ................. E21B 33/16 |
| | | 166/291 |
| 2005/0061369 A1 | 3/2005 | De Almeida |
| 2005/0072576 A1 * | 4/2005 | Henriksen ............... E21B 34/08 |
| | | 166/321 |
| 2005/0093250 A1 | 5/2005 | Santi et al. |
| 2005/0199401 A1 | 9/2005 | Patel et al. |
| 2006/0144591 A1 | 7/2006 | Gonzalez |
| 2006/0272806 A1 | 12/2006 | Wilkie et al. |
| 2007/0089875 A1 | 4/2007 | Steele et al. |
| 2007/0089910 A1 | 4/2007 | Hewson et al. |
| 2007/0095532 A1 | 5/2007 | Head |
| 2007/0137826 A1 | 6/2007 | Bosma et al. |
| 2007/0144734 A1 | 6/2007 | Xu et al. |
| 2007/0151724 A1 | 7/2007 | Ohmer et al. |
| 2007/0163781 A1 | 7/2007 | Walker |
| 2007/0221387 A1 | 9/2007 | Levy |
| 2007/0246213 A1 * | 10/2007 | Hailey, Jr. ............... E21B 43/04 |
| | | 166/278 |
| 2007/0267824 A1 | 11/2007 | Baugh et al. |
| 2007/0277979 A1 | 12/2007 | Todd et al. |
| 2008/0047708 A1 | 2/2008 | Spencer |
| 2008/0135249 A1 | 6/2008 | Fripp |

(56) References Cited

U.S. PATENT DOCUMENTS

| | | |
|---|---|---|
| 2008/0149351 A1 | 6/2008 | Marya |
| 2008/0290603 A1 | 11/2008 | Laflin |
| 2009/0014173 A1 | 1/2009 | Macleod |
| 2009/0084555 A1* | 4/2009 | Lee .................. E21B 34/14 166/319 |
| 2009/0102133 A1 | 4/2009 | Ruddock |
| 2009/0159278 A1 | 6/2009 | Corre |
| 2009/0200028 A1 | 8/2009 | Dewar |
| 2009/0250227 A1 | 10/2009 | Brown et al. |
| 2009/0250228 A1 | 10/2009 | Loretz |
| 2009/0272546 A1 | 11/2009 | Nutley et al. |
| 2009/0321087 A1 | 12/2009 | Victorov |
| 2010/0072711 A1 | 3/2010 | Doane |
| 2010/0078173 A1 | 4/2010 | Buytaert et al. |
| 2010/0096143 A1 | 4/2010 | Angman |
| 2010/0108148 A1* | 5/2010 | Chen .................. F16K 31/001 137/505.36 |
| 2010/0122819 A1 | 5/2010 | Wildman |
| 2010/0139930 A1 | 6/2010 | Patel |
| 2010/0155083 A1 | 6/2010 | Lynde et al. |
| 2010/0181080 A1 | 7/2010 | Levy |
| 2010/0225107 A1 | 9/2010 | Tverlid |
| 2010/0257913 A1 | 10/2010 | Storm, Jr. et al. |
| 2010/0307737 A1 | 12/2010 | Mellemstrand |
| 2011/0061876 A1 | 3/2011 | Johnson et al. |
| 2011/0098202 A1* | 4/2011 | James .................. C09K 8/5086 507/221 |
| 2011/0147014 A1 | 6/2011 | Chen et al. |
| 2012/0018143 A1 | 1/2012 | Lembcke |
| 2012/0048531 A1 | 3/2012 | Marzouk |
| 2012/0048561 A1* | 3/2012 | Holderman .............. E21B 43/12 166/316 |
| 2012/0048623 A1 | 3/2012 | Lafuente et al. |
| 2012/0049462 A1 | 3/2012 | Pitman |
| 2012/0168147 A1 | 7/2012 | Bowersock |
| 2012/0175134 A1 | 7/2012 | Robisson |
| 2012/0273236 A1 | 11/2012 | Gandikota et al. |
| 2013/0048289 A1 | 2/2013 | Mazyar et al. |
| 2013/0056207 A1 | 3/2013 | Wood et al. |
| 2013/0056221 A1* | 3/2013 | Johannessen ........... E21B 34/08 166/373 |
| 2013/0081815 A1 | 4/2013 | Mazyar et al. |
| 2013/0152824 A1 | 6/2013 | Crews |
| 2013/0153236 A1 | 6/2013 | Bishop |
| 2013/0161006 A1 | 6/2013 | Robisson et al. |
| 2013/0186615 A1 | 7/2013 | Hallunbaek et al. |
| 2013/0192853 A1 | 8/2013 | Themig |
| 2013/0277059 A1* | 10/2013 | Holderman ............. E21B 34/08 166/373 |
| 2013/0292117 A1 | 11/2013 | Robisson |
| 2014/0026335 A1 | 1/2014 | Smith |
| 2014/0034308 A1* | 2/2014 | Holderman ............. E21B 43/12 166/279 |
| 2014/0051612 A1 | 2/2014 | Mazyar |
| 2014/0262324 A1* | 9/2014 | Greci .................. E21B 43/08 166/194 |
| 2014/0262352 A1 | 9/2014 | Lembcke |
| 2015/0021049 A1 | 1/2015 | Davis et al. |
| 2015/0075768 A1 | 3/2015 | Wright et al. |
| 2015/0101813 A1 | 4/2015 | Zhao |
| 2015/0113913 A1 | 4/2015 | Kim |
| 2015/0184486 A1 | 7/2015 | Epstein |
| 2015/0233190 A1 | 8/2015 | Wolf et al. |
| 2015/0275587 A1 | 10/2015 | Wolf et al. |
| 2015/0337615 A1 | 11/2015 | Epstein et al. |
| 2015/0345248 A1 | 12/2015 | Carragher |
| 2015/0368990 A1 | 12/2015 | Jewett |
| 2015/0369003 A1 | 12/2015 | Hajjari et al. |
| 2016/0024896 A1 | 1/2016 | Johnson et al. |
| 2016/0024902 A1 | 1/2016 | Richter |
| 2016/0137912 A1 | 5/2016 | Sherman et al. |
| 2016/0138359 A1 | 5/2016 | Zhao |
| 2016/0145488 A1 | 5/2016 | Aines et al. |
| 2016/0145968 A1 | 5/2016 | Marya |
| 2016/0177668 A1 | 6/2016 | Watson et al. |
| 2016/0194936 A1 | 7/2016 | Allen |
| 2016/0208569 A1 | 7/2016 | Anderson et al. |
| 2016/0230495 A1 | 8/2016 | Mazyar et al. |
| 2016/0273312 A1 | 9/2016 | Steele et al. |
| 2016/0319633 A1 | 11/2016 | Cooper et al. |
| 2016/0326830 A1 | 11/2016 | Hallundbaek |
| 2016/0326849 A1 | 11/2016 | Bruce |
| 2016/0333187 A1 | 11/2016 | Bauer et al. |
| 2017/0015824 A1 | 1/2017 | Gozalo |
| 2017/0022778 A1 | 1/2017 | Fripp et al. |
| 2017/0107419 A1 | 4/2017 | Roy et al. |
| 2017/0107794 A1 | 4/2017 | Steele |
| 2017/0113275 A1 | 4/2017 | Roy et al. |
| 2017/0159401 A1 | 6/2017 | Saltel et al. |
| 2017/0175487 A1 | 6/2017 | Marcin et al. |
| 2017/0175488 A1 | 6/2017 | Lisowski |
| 2017/0191342 A1 | 7/2017 | Turley |
| 2017/0198191 A1 | 7/2017 | Potapenko |
| 2017/0234103 A1 | 8/2017 | Frazier |
| 2017/0306714 A1 | 10/2017 | Haugland |
| 2017/0314372 A1 | 11/2017 | Tolman |
| 2017/0350237 A1 | 12/2017 | Giem et al. |
| 2017/0356266 A1 | 12/2017 | Arackakudiyil |
| 2018/0023362 A1* | 1/2018 | Makowiecki ........... E21B 33/08 166/374 |
| 2018/0023366 A1 | 1/2018 | Deng et al. |
| 2018/0038193 A1 | 2/2018 | Walton |
| 2018/0080304 A1 | 3/2018 | Cortez et al. |
| 2018/0081468 A1 | 3/2018 | Bruce et al. |
| 2018/0086894 A1 | 3/2018 | Roy |
| 2018/0087350 A1 | 3/2018 | Sherman |
| 2018/0094508 A1* | 4/2018 | Smith .................. E21B 43/26 |
| 2018/0100367 A1 | 4/2018 | Perez |
| 2018/0128072 A1 | 5/2018 | Larsen |
| 2018/0128082 A1 | 5/2018 | Hollan et al. |
| 2018/0209234 A1 | 7/2018 | Manera |
| 2018/0223624 A1 | 8/2018 | Fripp |
| 2018/0298708 A1 | 10/2018 | Schmidt et al. |
| 2018/0334882 A1* | 11/2018 | Brandsdal ........... E21B 33/1208 |
| 2018/0347288 A1 | 12/2018 | Fripp |
| 2018/0363409 A1 | 12/2018 | Frazier |
| 2019/0016951 A1 | 1/2019 | Sherman et al. |
| 2019/0032435 A1 | 1/2019 | Kochanek et al. |
| 2019/0039126 A1 | 2/2019 | Sherman |
| 2019/0078414 A1 | 3/2019 | Frazier |
| 2019/0128092 A1 | 5/2019 | Mueller et al. |
| 2019/0136666 A1 | 5/2019 | Kent |
| 2019/0178054 A1 | 6/2019 | Bruce |
| 2019/0186228 A1 | 6/2019 | Beckett et al. |
| 2019/0225861 A1 | 7/2019 | Reddy |
| 2019/0249510 A1 | 8/2019 | Deng et al. |
| 2019/0264538 A1* | 8/2019 | Bowersock ........... E21B 34/142 |
| 2019/0316025 A1 | 10/2019 | Sherman |
| 2019/0383115 A1 | 12/2019 | Lees |
| 2020/0032574 A1 | 1/2020 | Fripp et al. |
| 2020/0056435 A1 | 2/2020 | Sherman |
| 2020/0072019 A1 | 3/2020 | Onti et al. |
| 2020/0080401 A1 | 3/2020 | Sherman |
| 2020/0080402 A1 | 3/2020 | Lang et al. |
| 2020/0240235 A1 | 7/2020 | Fripp et al. |
| 2020/0308945 A1 | 10/2020 | Surjaatmadja et al. |
| 2020/0325749 A1* | 10/2020 | Fripp .................. C09K 8/516 |
| 2020/0362224 A1 | 11/2020 | Wellhoefer |
| 2020/0370391 A1 | 11/2020 | Fripp et al. |
| 2021/0017835 A1 | 1/2021 | Pelto et al. |
| 2021/0040810 A1 | 2/2021 | Evers |
| 2021/0123310 A1 | 4/2021 | Fripp et al. |
| 2021/0123319 A1 | 4/2021 | Greci |
| 2021/0172286 A1* | 6/2021 | Barlow ................ E21B 21/103 |
| 2021/0187604 A1 | 6/2021 | Sherman et al. |
| 2021/0270093 A1 | 9/2021 | Fripp |
| 2021/0270103 A1 | 9/2021 | Greci et al. |
| 2021/0332673 A1 | 10/2021 | Fripp |
| 2021/0348478 A1* | 11/2021 | Novelen ............... E21B 34/125 |
| 2021/0363849 A1 | 11/2021 | Al Yahya |
| 2022/0106847 A1 | 4/2022 | Dahl |

(56) References Cited

U.S. PATENT DOCUMENTS

| | | | |
|---|---|---|---|
| 2022/0186575 A1 | 6/2022 | Fripp | |
| 2022/0205336 A1 | 6/2022 | Asthana | |
| 2022/0372837 A1 | 11/2022 | Holderman et al. | |

FOREIGN PATENT DOCUMENTS

| | | |
|---|---|---|
| CN | 205422632 U | 8/2016 |
| CN | 107148444 A | 9/2017 |
| CN | 108194756 A | 6/2018 |
| CN | 107148444 B | 1/2019 |
| CN | 108194756 B | 8/2020 |
| EP | 15726 A1 | 9/1980 |
| EP | 869257 A2 | 10/1998 |
| EP | 940558 A1 | 9/1999 |
| EP | 0940558 B1 | 1/2005 |
| EP | 1757770 A1 | 2/2007 |
| EP | 1910728 A1 | 4/2008 |
| EP | 1910728 B1 | 9/2009 |
| EP | 2447466 A2 | 5/2012 |
| EP | 2501890 A2 | 9/2012 |
| EP | 2501890 B | 7/2014 |
| EP | 2447466 A3 | 3/2017 |
| EP | 3144018 A1 | 3/2017 |
| EP | 3144018 A4 | 5/2017 |
| EP | 3196402 A1 | 7/2017 |
| EP | 3144018 B1 | 9/2018 |
| EP | 2447466 B1 | 10/2018 |
| GB | 2444060 A | 5/2008 |
| GB | 2444060 B | 12/2008 |
| JP | 2003090037 A | 3/2003 |
| JP | 2003293354 A | 10/2003 |
| JP | 2004169303 A | 6/2004 |
| JP | 2015175449 A | 10/2015 |
| KR | 20020014619 A | 2/2002 |
| KR | 20080096576 A | 10/2008 |
| WO | 02/02900 A2 | 1/2002 |
| WO | 02/02900 A3 | 5/2002 |
| WO | 02/02900 A8 | 12/2003 |
| WO | 2005/022012 A1 | 3/2005 |
| WO | 2006/045794 A1 | 5/2006 |
| WO | 2007/047089 A1 | 4/2007 |
| WO | 2012/094322 A2 | 7/2012 |
| WO | 2012/125660 A2 | 9/2012 |
| WO | 2012/094322 A3 | 10/2012 |
| WO | 2012/125660 A3 | 2/2013 |
| WO | 2014/028149 A1 | 2/2014 |
| WO | 2014/182301 A1 | 11/2014 |
| WO | 2014/193042 A1 | 12/2014 |
| WO | 2015/057338 A1 | 4/2015 |
| WO | 2015/069886 A2 | 5/2015 |
| WO | 2015/069886 A3 | 9/2015 |
| WO | 2015/183277 A1 | 12/2015 |
| WO | 2016/000068 A1 | 1/2016 |
| WO | 2016/171666 A1 | 10/2016 |
| WO | 2017/100417 A1 | 6/2017 |
| WO | 2018/055382 A1 | 3/2018 |
| WO | 2019/094044 A1 | 5/2019 |
| WO | 2019/122857 A1 | 6/2019 |
| WO | 2019/147285 A1 | 8/2019 |
| WO | 2019/151870 A1 | 8/2019 |
| WO | 2019/164499 A1 | 8/2019 |
| WO | 2020/005252 A1 | 1/2020 |
| WO | 2020/141203 A1 | 7/2020 |
| WO | 2019/164499 A8 | 8/2020 |
| WO | 2020/167288 A1 | 8/2020 |
| WO | 2020/204940 A1 | 10/2020 |
| WO | 2021/034325 A1 | 2/2021 |
| WO | 2021/086317 A1 | 5/2021 |
| WO | 2021/096519 A1 | 5/2021 |
| WO | 2021/126279 A1 | 6/2021 |

\* cited by examiner

VALVE INCLUDING AN EXPANDABLE METAL SEAL

CROSS-REFERENCE TO RELATED APPLICATION

This application is a continuation of U.S. application Ser. No. 17/395,958, filed on Aug. 6, 2021, entitled "A VALVE INCLUDING AN EXPANDABLE METAL SEAL," which claims the benefit of U.S. Provisional Application Ser. No. 63/065,248, filed on Aug. 13, 2020, entitled "SWELLABLE METAL WIPER PLUG," commonly assigned with this application and incorporated herein by reference in their entirety.

BACKGROUND

In cementing casing or liners (both referred to hereinafter as "casing") in well bores (a process known as primary cementing), a cement slurry is pumped downwardly through the casing to be cemented and then upwardly into the annulus between the casing and the walls of the well bore. Upon setting, the cement bonds the casing to the walls of the well bore and restricts fluid movement between formations or zones penetrated by the well bore.

Prior to a primary cementing operation, the casing is suspended in a well bore and both the casing and the well bore are usually filled with drilling fluid. In order to reduce contamination of the cement slurry at the interface between it and the drilling fluid, a displacement plug for sealingly engaging the inner surfaces of the casing is pumped ahead of the cement slurry whereby the cement slurry is separated from the drilling fluid as the cement slurry and drilling fluid ahead of it are displaced through the casing. The displacement plug wipes the drilling fluid from the walls of the casing and maintains a separation between the cement slurry and drilling fluid until the plug lands on a float collar attached near the bottom end of the casing.

The displacement plug, which precedes the cement slurry and separates it from drilling fluid is referred to herein as the "bottom plug." When the predetermined required quantity of the cement slurry has been pumped into the casing, a second displacement plug, referred to herein as the "top plug", is released into the casing to separate the cement slurry from additional drilling fluid or other displacement fluid used to displace the cement slurry. In certain situations, the bottom plug is not used, but the top plug is.

When the bottom plug lands on the float collar attached to the casing, a valve mechanism opens which allows the cement slurry to proceed through the plug and the float collar upwardly into the annular space between the casing and the well bore. The design of the top plug is such that when it lands on the bottom plug it shuts off fluid flow through the cementing plugs which prevents the displacement fluid from entering the annulus. After the top plug lands, the pumping of the displacement fluid into the casing is often continued whereby the casing is pressured up and the casing and associated equipment including the pump are pressure tested for leaks or other defects.

BRIEF DESCRIPTION

Reference is now made to the following descriptions taken in conjunction with the accompanying drawings, in which.

DETAILED DESCRIPTION

Figure 1:
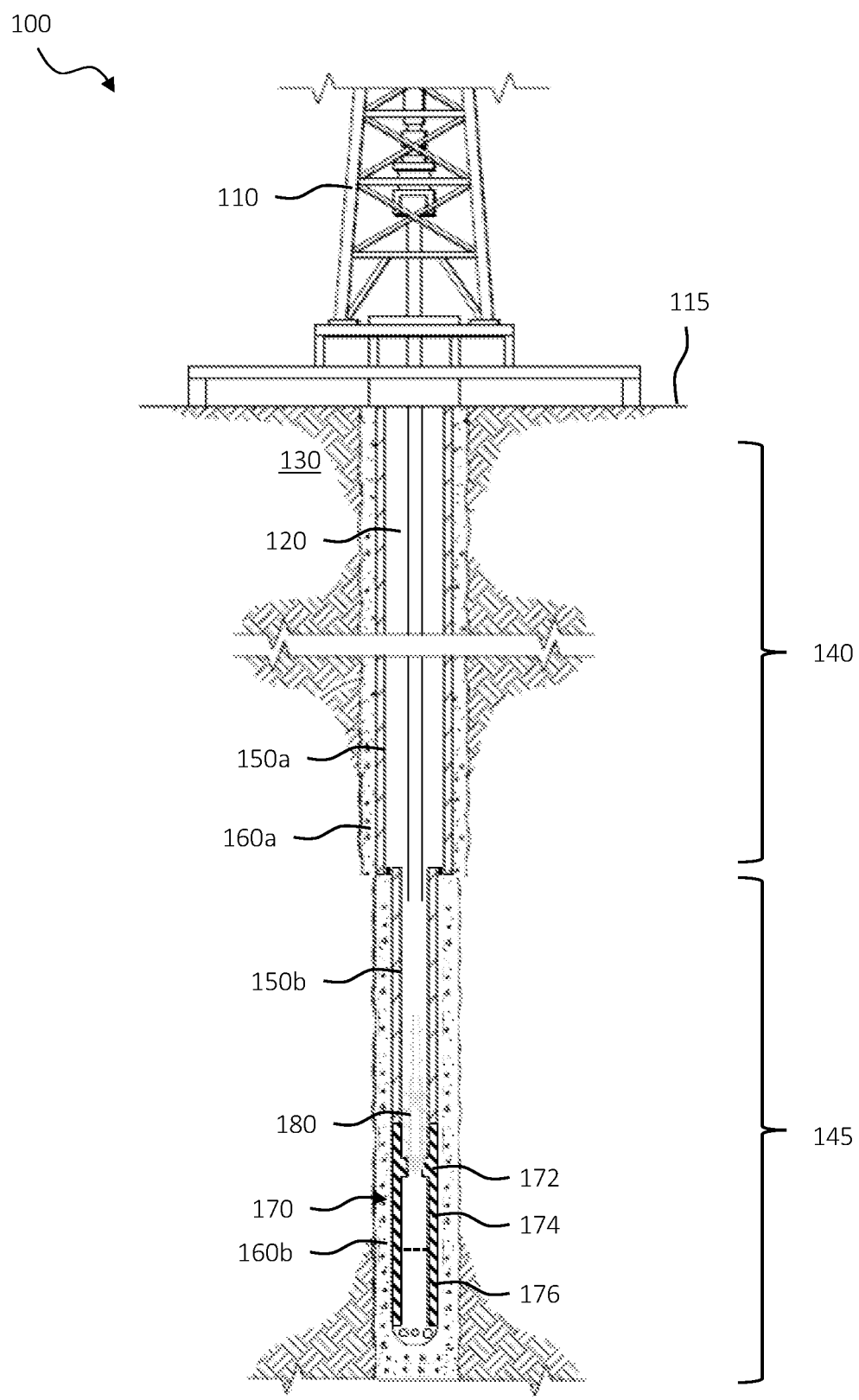
FIG. 1 illustrates a well system including an exemplary operating environment that the apparatuses, systems and methods disclosed herein may be employed.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the ground; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

Referring to FIG. 1, depicted is a well system 100 including an exemplary operating environment that the apparatuses, systems and methods disclosed herein may be employed. For example, the well system 100 could include a pre or post expansion displacement plug 180 according to any of the embodiments, aspects, applications, variations, designs, etc. disclosed in the following paragraphs. As depicted, the well system 100 includes a workover and/or drilling rig 110 that is positioned above the earth's surface 115 and extends over and around a wellbore 120 that penetrates a subterranean formation 130 for the purpose of recovering hydrocarbons. The subterranean formation 130 may be located below exposed earth, as shown, as well as areas below earth covered by water, such as ocean or fresh water. As those skilled in the art appreciate, the wellbore 120 may be fully cased, partially cased, or an open hole wellbore. In the illustrated embodiment of FIG. 1, the wellbore 120 is partially cased, and thus includes a cased region 140 and an open hole region 145.

The wellbore 120 may be drilled into the subterranean formation 130 using any suitable drilling technique. In the example illustrated in FIG. 1, the wellbore 120 extends substantially vertically away from the earth's surface 115. Notwithstanding, in other embodiments the wellbore 120 could include a vertical wellbore portion, deviate from vertical relative to the earth's surface 115 over a deviated wellbore portion, and then transition to a horizontal wellbore portion. In alternative operating environments, all or portions of a wellbore 120 may be vertical, deviated at any suitable angle, horizontal, and/or curved. The wellbore 120 may be a new wellbore, an existing wellbore, a straight wellbore, an extended reach wellbore, a sidetracked wellbore, a multi-lateral wellbore, or any other type of wellbore for drilling, completing, and/or the production of one or more zones. Further, the wellbore 120 may be used for both producing wells and injection wells.

In accordance with the disclosure, the wellbore 120 may include a wellbore tubular 150 (e.g., wellbore tubulars 150a, 150b). The wellbore tubular 150a, in the illustrated embodiment, is wellbore casing. The wellbore tubular 150b, in the illustrated embodiment, is a liner. Nevertheless, the present disclosure should not be limited to any specific wellbore tubular. In particular, the wellbore tubular may include any tubular having an annulus that surrounds it, as might be found with a concentric set of wellbore tubulars. The wellbore tubular 150a, in the illustrated embodiment of FIG. 1, is held in place by cement 160a in the cased region 140. The wellbore tubular 150b, in the illustrated embodiment of FIG. 1, is held in place by cement 160b in the open hole region 145.

In the illustrated embodiment of FIG. 1, a shoe track 170 has been positioned at a lower end of the wellbore tubular 150. The shoe track 170, in one embodiment, includes a landing collar 172, a float collar 174, and a float shoe 176. Nevertheless, other designs for shoe tracks are within the scope of the disclosure.

In the illustrated embodiment, the displacement plug 180 has landed within the shoe track 170, and more specifically within the landing collar 172 of the shoe track. The displacement plug 180, pre-expansion, includes a plug body for landing in the wellbore tubular, wherein at least a portion of the plug body comprises a metal configured to expand in response to hydrolysis to seal against the wellbore tubular, and one or more displacement features engaged with the plug body for displacing the plug body downhole. The displacement plug 180, post-expansion, includes a cement plug body locked in the wellbore tubular, and one or more displacement features engaged with the cement plug body.

As briefly indicated above, the expandable metal (e.g., in at least on embodiment) automatically, and without intervention, expands in response to hydrolysis to lock the displacement plug 180 in place. Accordingly, what results are one or more expanded metal sections of the displacement plug 180. The term expandable metal, as used herein, refers to the expandable metal in a pre-expansion form. Similarly, the term expanded metal, as used herein, refers to the resulting expanded metal after the expandable metal has been subjected to reactive fluid, as discussed below. Additionally, the term partially expanded metal, as used herein, refers to the resulting expanded metal after a portion of the expandable metal has been subjected to reactive fluid, as discussed below.

The expanded metal, in accordance with one or more aspects of the disclosure, comprises a metal that has expanded in response to hydrolysis. In certain embodiments, the expanded metal includes residual unreacted metal, such as when it is partially expanded metal. For example, in certain embodiments the expanded metal is intentionally designed to include the residual unreacted metal. The residual unreacted metal has the benefit of allowing the expanded metal to self-heal if cracks or other anomalies subsequently arise, or for example to accommodate changes in the tubular or mandrel diameter due to variations in temperature and/or pressure. Nevertheless, other embodiments may exist wherein no residual unreacted metal exists in the expanded metal.

The expandable metal, in some embodiments, may be described as expanding to a cement like material. In other words, the expandable metal goes from metal to micron-scale particles and then these particles expand and lock together to, in essence, seal two or more surfaces together. The reaction may, in certain embodiments, occur in less than 2 days in a reactive fluid and in certain temperatures. Nevertheless, the time of reaction may vary depending on the reactive fluid, the expandable metal used, the downhole temperature, and surface-area-to-volume ratio (SA:V) of the expandable metal.

In some embodiments, the reactive fluid may be a brine solution such as may be produced during well completion activities, and in other embodiments, the reactive fluid may be one of the additional solutions discussed herein, including drilling fluid and/or cement slurry. The metal, pre-expansion, is electrically conductive in certain embodiments. The metal may be machined to any specific size/shape, extruded, formed, cast or other conventional ways to get the desired shape of a metal, as will be discussed in greater detail below. Metal, pre-expansion, in certain embodiments has a yield strength greater than about 8,000 psi, e.g., 8,000 psi+/−50%. It has been measured that the post expansion displacement plug 180 can hold over 3,000 psi in a 4½" tubing with an 18" long plug, which is about 160 psi per inch. In certain other embodiments, the displacement plug 180 may hold at least 300 psi per inch of plug length.

The hydrolysis of the expandable metal can create a metal hydroxide. The formative properties of alkaline earth metals (Mg—Magnesium, Ca—Calcium, etc.) and transition metals (Zn—Zinc, Al—Aluminum, etc.) under hydrolysis reactions demonstrate structural characteristics that are favorable for use with the present disclosure. Hydration results in an increase in size from the hydration reaction and results in a metal hydroxide that can precipitate from the fluid.

The hydration reactions for magnesium is:

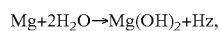

$$Mg+2H_2O \rightarrow Mg(OH)_2 + Hz,$$

where $Mg(OH)_2$ is also known as brucite. Another hydration reaction uses aluminum hydrolysis. The reaction forms a material known as Gibbsite, bayerite, boehmite, aluminum oxide, and norstrandite, depending on form. The possible hydration reactions for aluminum are:

$$Al+3H_2O \rightarrow Al(OH)_3+3/2\ H_2.$$

$$Al+2H_2O \rightarrow AlO(OH)+3/2 H_2$$

$$Al+3/2H_2O \rightarrow 1/2 Al_2O_3+3/2 H_2$$

Another hydration reaction uses calcium hydrolysis. The hydration reaction for calcium is:

$$Ca+2H_2O \rightarrow Ca(OH)_2+Hz,$$

Where $Ca(OH)_2$ is known as portlandite and is a common hydrolysis product of Portland cement. Magnesium hydroxide and calcium hydroxide are considered to be relatively insoluble in water. Aluminum hydroxide can be considered an amphoteric hydroxide, which has solubility in strong acids or in strong bases. Alkaline earth metals (e.g., Mg, Ca, etc.) work well for the expandable metal, but transition metals (Al, etc.) also work well for the expandable metal. In one embodiment, the metal hydroxide is dehydrated by the swell pressure to form a metal oxide.

In an embodiment, the expandable metal used can be a metal alloy. The expandable metal alloy can be an alloy of the base expandable metal with other elements in order to either adjust the strength of the expandable metal alloy, to adjust the reaction time of the expandable metal alloy, or to adjust the strength of the resulting metal hydroxide byproduct, among other adjustments. The expandable metal alloy can be alloyed with elements that enhance the strength of the metal such as, but not limited to, Al—Aluminum, Zn—Zinc, Mn—Manganese, Zr—Zirconium, Y—Yttrium, Nd—Neodymium, Gd—Gadolinium, Ag—Silver, Ca—Calcium, Sn—Tin, and Re—Rhenium, Cu—Copper. In some embodiments, the expandable metal alloy can be alloyed with a dopant that promotes corrosion, such as Ni—Nickel, Fe—Iron, Cu—Copper, Co—Cobalt, Ir—Iridium, Au—Gold, C—Carbon, Ga—Gallium, In—Indium, Mg—Mercury, Bi—Bismuth, Sn—Tin, and Pd—Palladium. The expandable metal alloy can be constructed in a solid solution process where the elements are combined with molten metal or metal alloy. Alternatively, the expandable metal alloy could be constructed with a powder metallurgy process. The expandable metal can be cast, forged, extruded, sintered, welded, mill machined, lathe machined, stamped, eroded or a combination thereof. The metal alloy can be a mixture of the metal and metal oxide. For example, a powder mixture of aluminum and aluminum oxide can be ball-milled together to increase the reaction rate.

Optionally, non-expanding components may be added to the starting metallic materials. For example, ceramic, elastomer, plastic, epoxy, glass, or non-reacting metal components can be embedded in the expandable metal or coated on the surface of the expandable metal. In yet other embodiments, the non-expanding components are metal fibers, a composite weave, a polymer ribbon, or ceramic granules, among others. Alternatively, the starting expandable metal may be the metal oxide. For example, calcium oxide (CaO) with water will produce calcium hydroxide in an energetic reaction. Due to the higher density of calcium oxide, this can have a 260% volumetric expansion (e.g., converting 1 mole of CaO may cause the volume to increase from 9.5 cc to 34.4 cc). In one variation, the expandable metal is formed in a serpentinite reaction, a hydration and metamorphic reaction. In one variation, the resultant material resembles a mafic material. Additional ions can be added to the reaction, including silicate, sulfate, aluminate, carbonate, and phosphate. The metal can be alloyed to increase the reactivity or to control the formation of oxides.

The expandable metal can be configured in many different fashions, as long as an adequate volume of material is available for setting the displacement plug 180. For example, the expandable metal may be formed into a single long member, multiple short members, rings, among others. In another embodiment, the expandable metal may be formed into a long wire of expandable metal, that can be in turn be wound around a tubular as a sleeve. The wire diameters do not need to be of circular cross-section, but may be of any cross-section. For example, the cross-section of the wire could be oval, rectangle, star, hexagon, keystone, hollow braided, woven, twisted, among others, and remain within the scope of the disclosure. In certain other embodiments, the expandable metal is a collection of individual separate chunks of the metal held together with a binding agent. In yet other embodiments, the expandable metal is a collection of individual separate chunks of the metal that are not held together with a binding agent, but held in place using one or more different techniques. In at least one other embodiment, one or more of the displacement features of the displacement plug 180 comprise the expandable metal.

Additionally, a delay coating may be applied to one or more portions of the expandable metal to delay the expanding reactions. In one embodiment, the material configured to delay the hydrolysis process is a fusible alloy. In another embodiment, the material configured to delay the hydrolysis process is a eutectic material. In yet another embodiment, the material configured to delay the hydrolysis process is a wax, oil, or other non-reactive material.

Figure 2A:
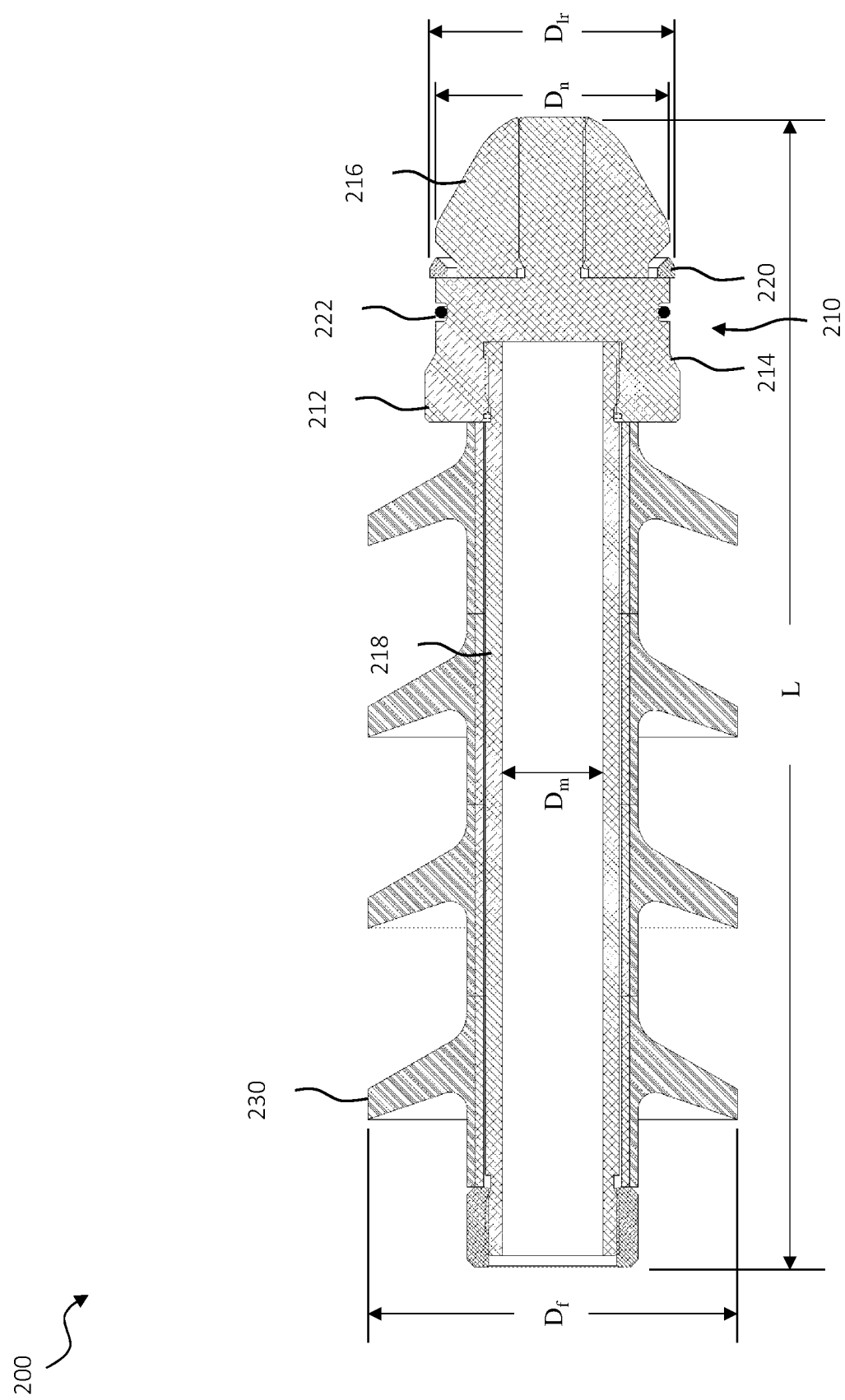
FIGS. 2A and 2B illustrate a displacement plug for use in a wellbore tubular designed and manufactured according to one or more embodiments of the disclosure.
Figure 2B:
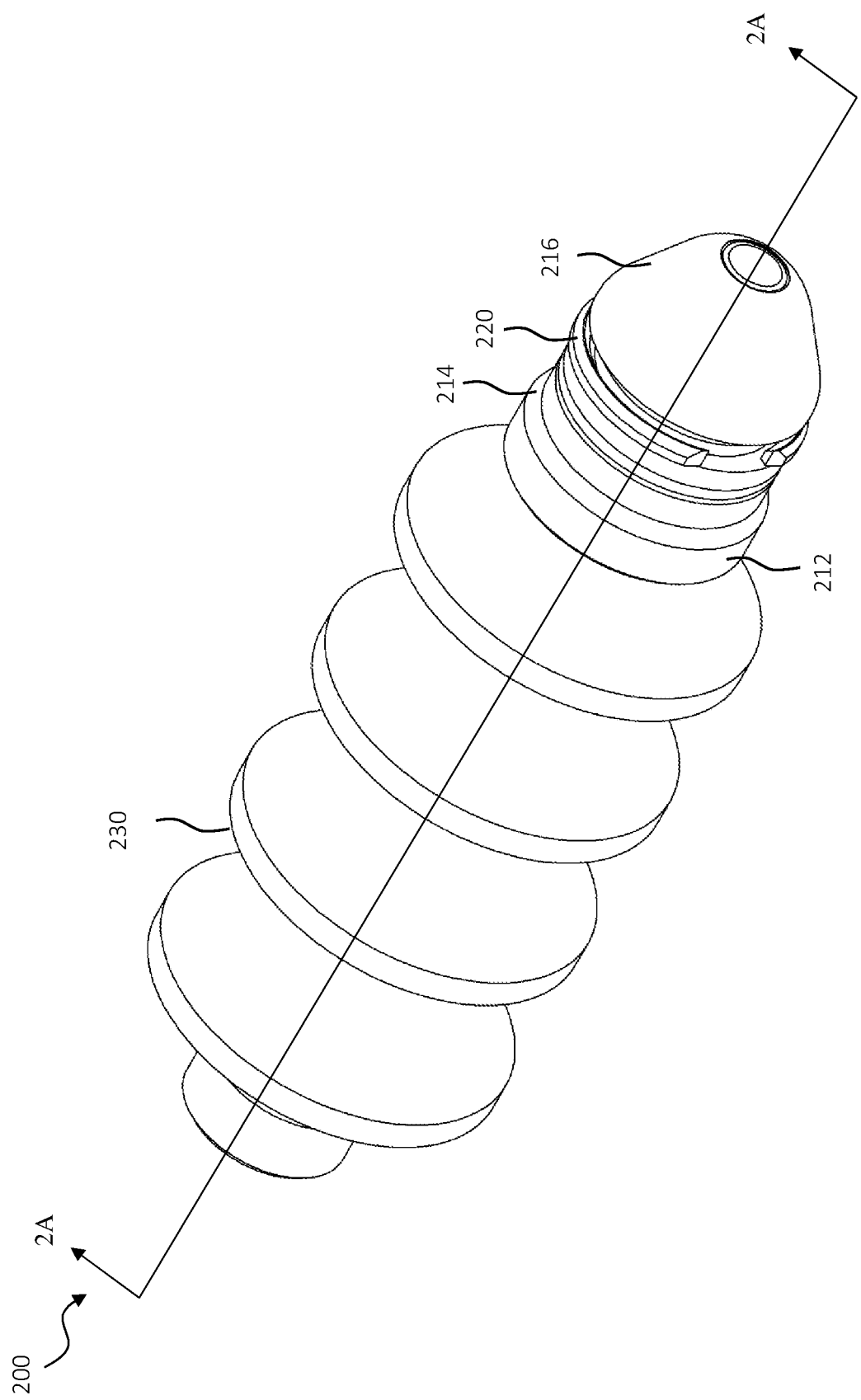

Turning to FIGS. 2A and 2B, illustrated is a displacement plug 200 (e.g., pre-expansion displacement plug) for use in a wellbore tubular designed and manufactured according to one or more embodiments of the disclosure. FIG. 2A illustrates a cross-sectional view of the displacement plug 200, whereas FIG. 2B illustrated an isometric view of the displacement plug 200. With reference to FIG. 2A, the displacement plug 200 includes a plug body 210, wherein at least a portion of the plug body 210 comprises a metal configured to expand in response to hydrolysis to seal against a wellbore tubular, as discussed above. In the illustrated embodiment of FIG. 2A, the plug body 210 includes a nose 212 having a nose shoulder 214, a nose nut 216, a tubular 218 (e.g., mandrel in one embodiment), a lock ring 220, and an O-ring 222. Any one or more of the nose 212, nose nut 216, tubular 218, and/or lock ring 220 may comprise the expandable metal. While the plug body 210 has been illustrated as having a variety of different features, any plug body according to the disclosure could be used.

Engaged with the plug body 210 are one or more displacement features 230. In at least one embodiment, the one or more displacement features are displacement fins. In yet another embodiment, the one or more displacement features are one or more compressible features, such as compressible (e.g., foam) drop balls. The one or more displacement features 230, in one embodiment, comprise rubber. The one or more displacement features 230, in another embodiment, comprise plastic or metal. In yet another embodiment, the one or more displacement features 230 comprise a foam material. In yet another embodiment, at least one of the one or more displacement features 230 comprises a metal configured to expand in response to hydrolysis, as discussed above. While the one or more displacement features 230 have been illustrated with a wiper like shape, other embodiments exist wherein a non-wiper like shape is used, such as when balls are used.

The nose nut 216 may have a variety of different outside diameters (Do) and remain within the scope of the disclosure. In one embodiment, the nose nut 216 has a diameter (Do) ranging from 3.4 inches to 17.5 inches. The tubular 218 may have a variety of different inside diameters ($D_m$) and remain within the scope of the disclosure. In one embodiment, the tubular 218 has a diameter ($D_m$) ranging from 1.5 inches to 7.5 inches. The lock ring 220 may have a variety of different outside diameters ($D_{lr}$) and remain within the scope of the disclosure. In one embodiment, the lock ring 220 has a diameter ($D_{lr}$) ranging from 3.7 inches to 18.5 inches. The one or more displacement features 230 may have a variety of different outside diameters ($D_f$) and remain within the scope of the disclosure. In one embodiment, the one or more displacement features 230 have a diameter ($D_f$) ranging from 5.5 inches to 27.5 inches. The displacement plug 200 may have a variety of different lengths (L) and remain within the scope of the disclosure. In one embodiment, the displacement plug 200 has a length (L) ranging from 4 inches to 72 inches, and in another embodiment has a length (L) ranging from 8 inches to 36 inches.

Figure 3:
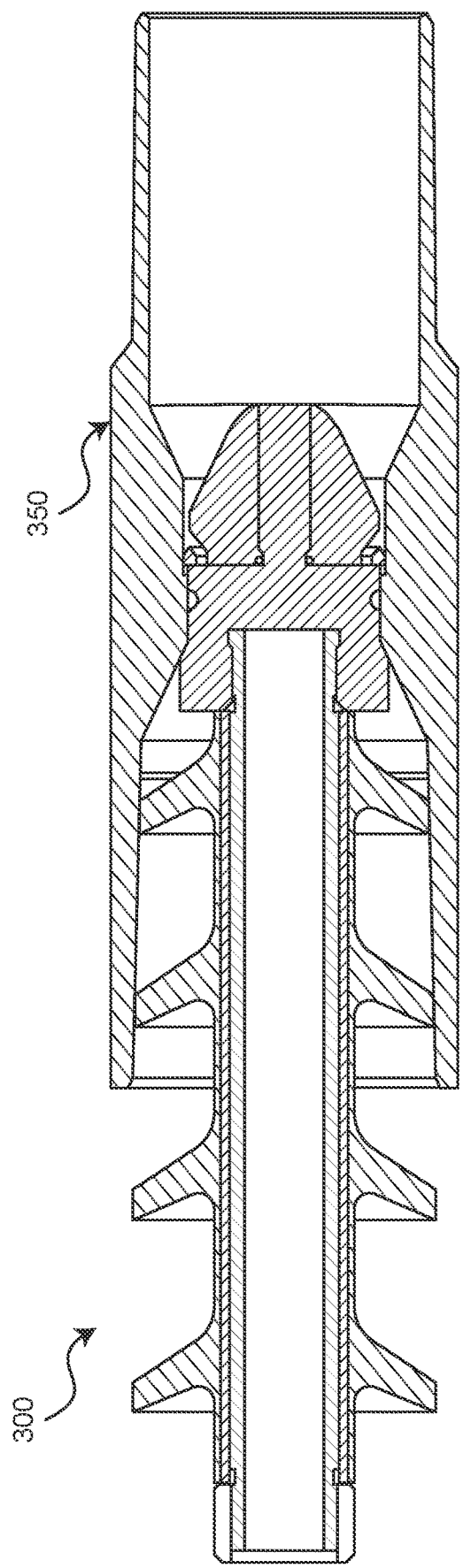
FIG. 3 illustrates is one embodiment of a displacement plug designed and manufactured according to one or more embodiments of the disclosure within a wellbore tubular.
Figure 4:
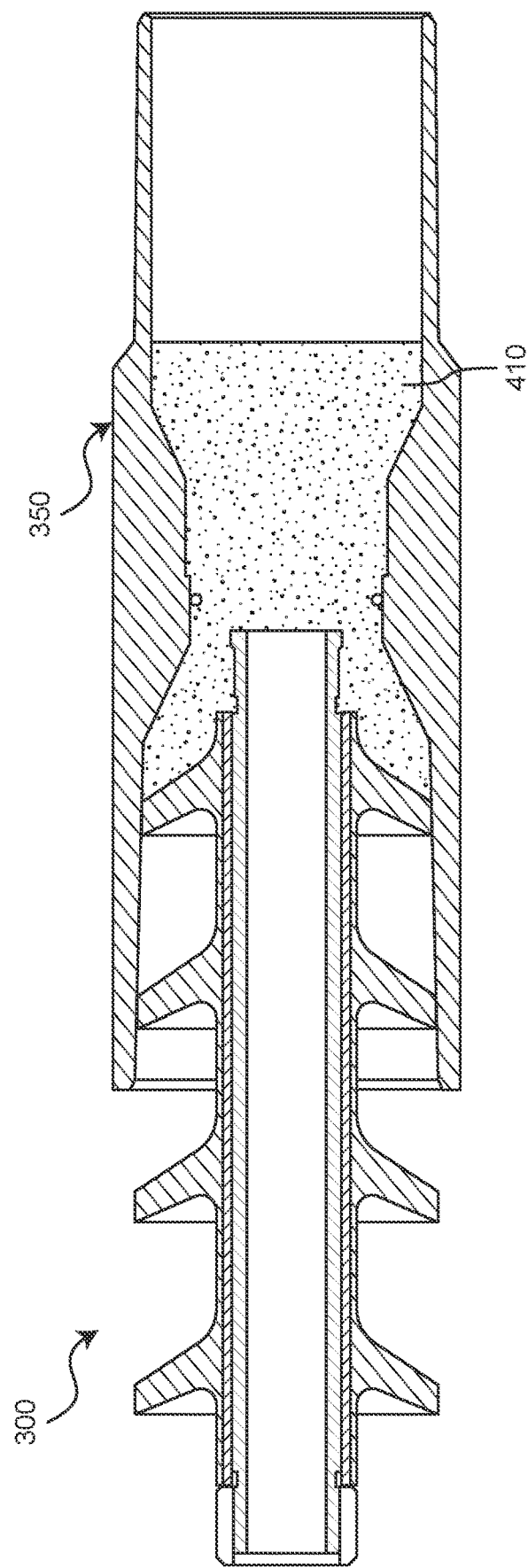
FIG. 4 illustrates the displacement plug of FIG. 3 after it has expanded to form an expanded displacement plug.

Turning to FIG. 3, illustrated is one embodiment of a displacement plug 300 designed and manufactured according to one or more embodiments of the disclosure within a wellbore tubular 350. The displacement plug 300, in one embodiment, is similar to the displacement plug 200 of FIGS. 2A and 2B. The wellbore tubular 350, in the illustrated embodiment, is a landing plug, nevertheless other wellbore tubulars might be used. Turning to FIG. 4, illustrated is the displacement plug 300 of FIG. 3 after it has expanded to form an expanded displacement plug 410.

Figure 5:
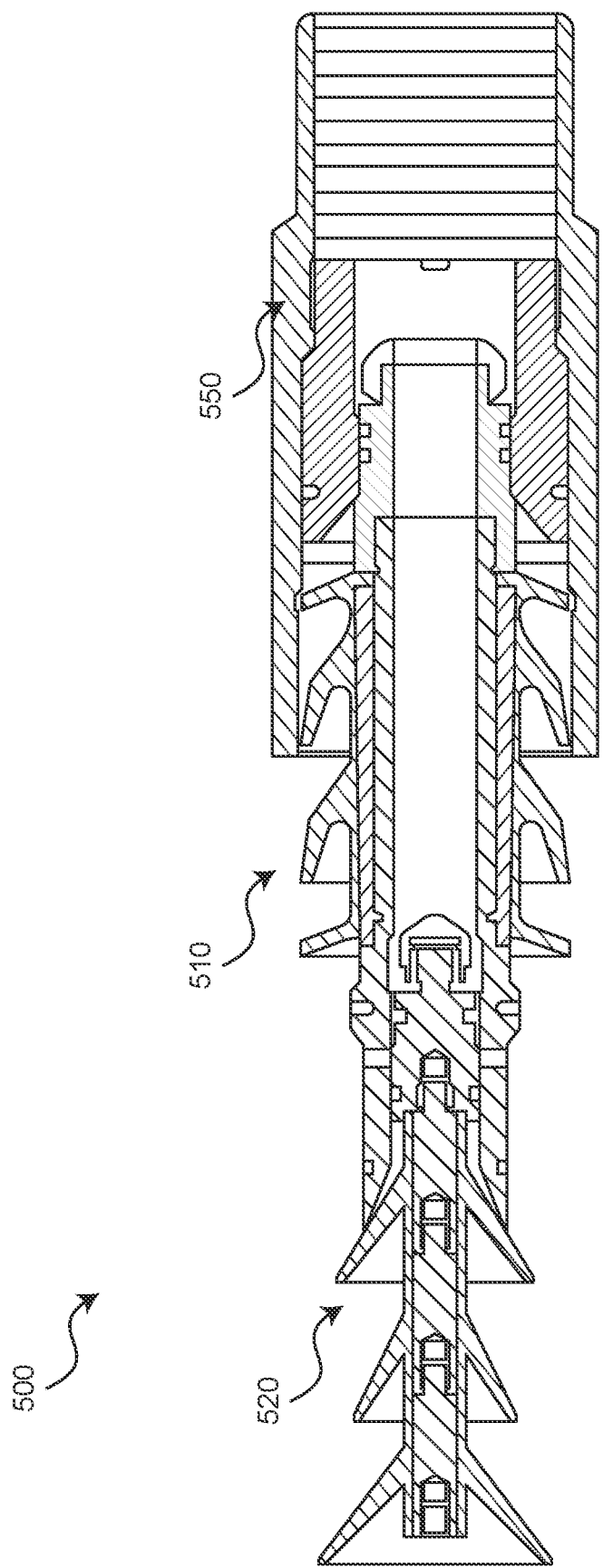
FIG. 5 illustrates an alternative embodiment of a displacement plug for use in a wellbore tubular designed and manufactured according to one or more embodiments of the disclosure.

Turning to FIG. 5, illustrated is an alternative embodiment of a displacement plug 500 for use in a wellbore tubular 550 designed and manufactured according to one or more embodiments of the disclosure. The displacement plug 500, in the illustrated embodiment, comprises a first casing displacement plug 510 and a second drill pipe displacement plug 520. In accordance with the disclosure, each of the casing displacement plug 510 and the drill pipe displacement plug 520 may include a plug body, wherein at least a portion of the plug body comprises a metal configured to expand in response to hydrolysis to seal against a wellbore tubular.

Figure 6:
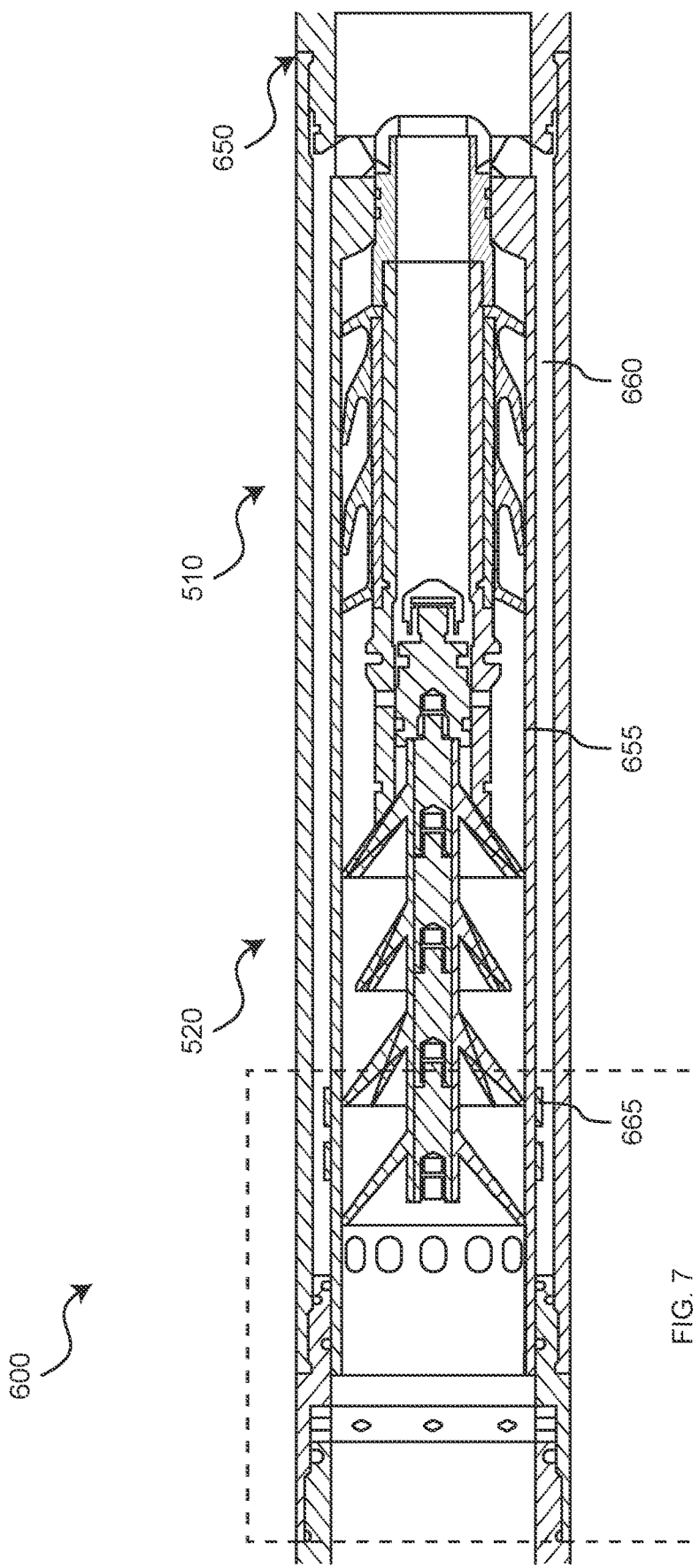
FIG. 6 illustrates an alternative embodiment of a displacement plug for use in a wellbore tubular designed and manufactured according to one or more embodiments of the disclosure.

Turning to FIG. 6, illustrated is an alternative embodiment of a displacement plug 600 for use in a wellbore tubular 650 designed and manufactured according to one or more embodiments of the disclosure. The displacement plug 600 is similar in many respects to the displacement plug 500 of FIG. 5. Accordingly, like reference numbers have been used to indicate similar, if not substantially identical, features. The displacement plug 600 differs, for the most part, from the displacement plug 500, in that the wellbore tubular 650 is a wet shoe sub. Accordingly, the wellbore tubular 650 has a sliding sleeve 655 disposed therein, the sliding sleeve 655 configured to slide to open a flow path 660 below the plug body. The wellbore tubular 650, in the illustrated embodiment, further includes one or more plug members 665 positioned within the flow path 660, the one or more plug members 665 comprising the metal configured to expand in response to hydrolysis to seal the flow path. The plug member 665 metal may be similar to one or more of those discussed above.

Figure 7:
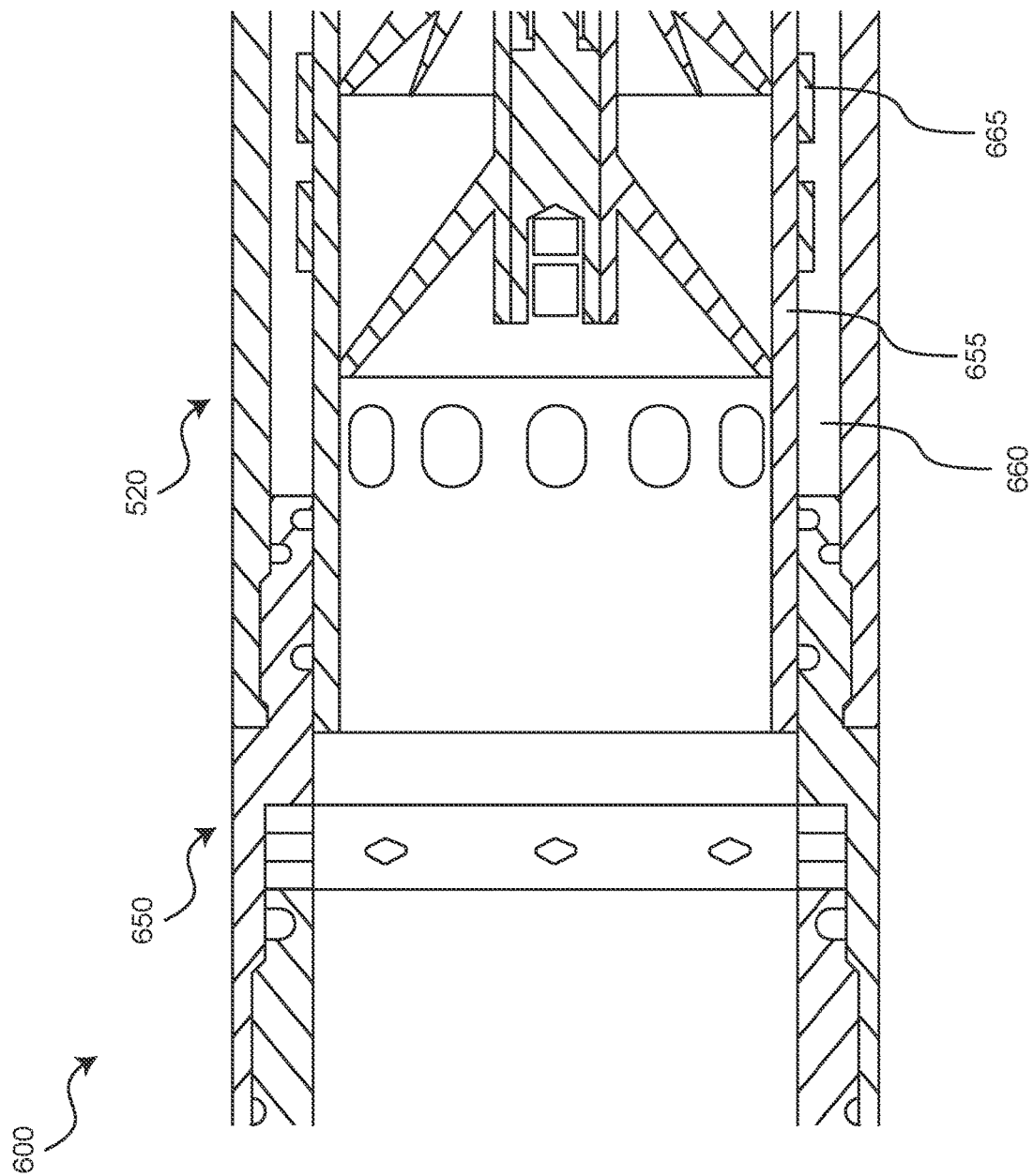
FIG. 7 illustrates an enlarged view of the displacement plug and the wellbore tubular of FIG. 6, clearly depicting the one or more plug member.
Figure 8:
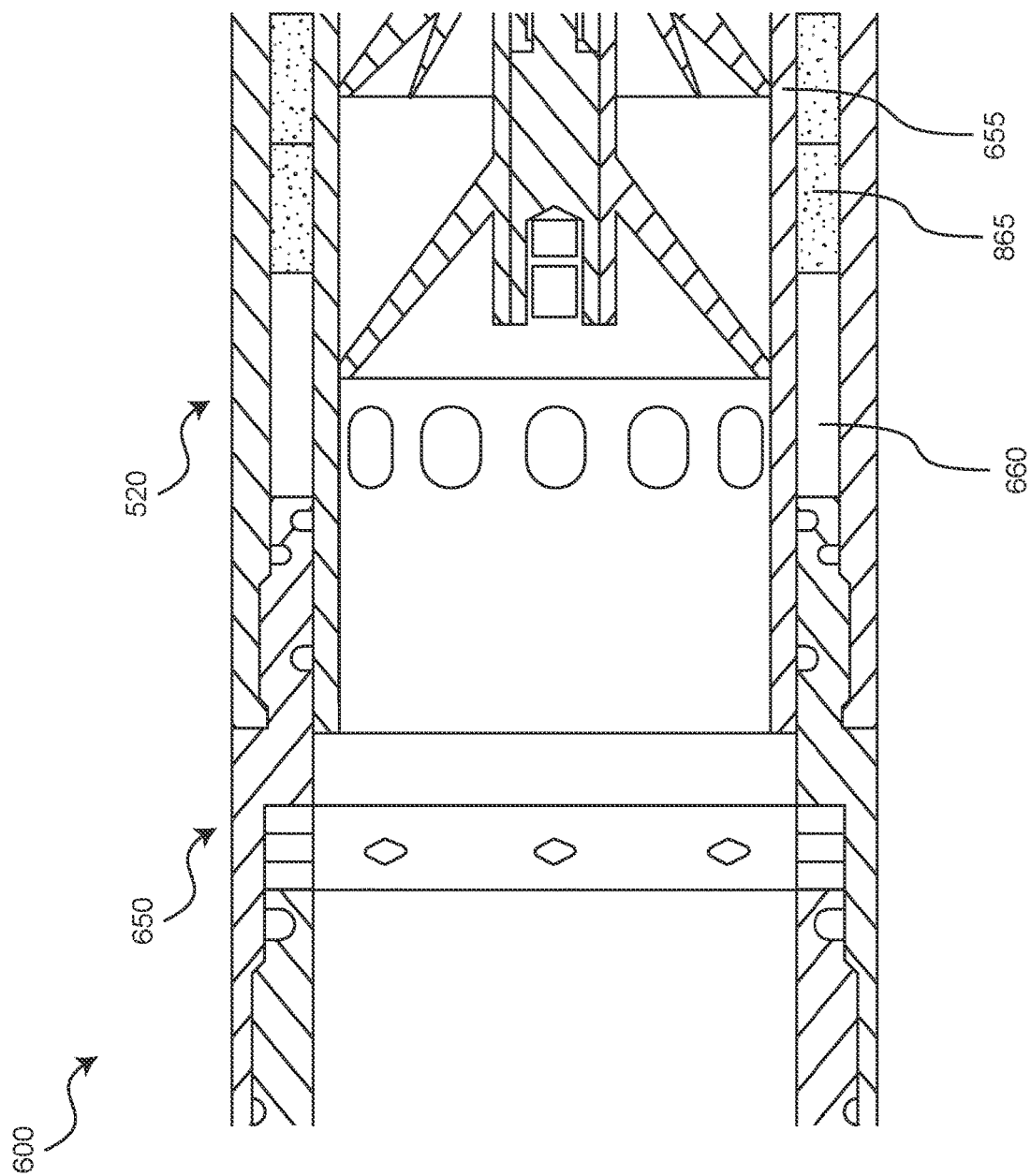
FIG. 8 illustrates the displacement plug and the wellbore tubular of FIG. 7 after the one or more plug member have expanded to seal the flow path.

Turning to FIG. 7, illustrated is an enlarged view of the displacement plug 600 and the wellbore tubular 650, clearly depicting the one or more plug member 665. Turning to FIG. 8, illustrated are the displacement plug 600 and the wellbore tubular 650 of FIG. 7 after the one or more plug member 665 have expanded to seal the flow path 660. What results are one or more expanded plug members 865.

The present disclosure has discussed the one or more plug members 665 as being used with the displacement plug 600, however, certain embodiments exist wherein the one or more plug members 665 comprising a metal configured to expand in response to hydrolysis could be used to seal any flow path, but particularly any flow path in an annulus between a sliding sleeve and a wellbore tubular and/or mandrel.

Aspects disclosed herein include:

A. A displacement plug for use in a wellbore tubular, the displacement plug including: 1) a plug body for landing in a wellbore tubular, wherein at least a portion of the plug body comprises a metal configured to expand in response to hydrolysis to seal against the wellbore tubular; and 2) one or more displacement features engaged with the plug body for displacing the plug body downhole.

B. A method for entering a well system, the method including: 1) pumping fluid within a wellbore tubular; 2) positioning a displacement plug in the wellbore tubular after pumping the fluid, the displacement plug landing in the wellbore tubular, the displacement plug including: a) a plug body for landing in the wellbore tubular, wherein at least a portion of the plug body comprises a metal configured to expand in response to hydrolysis to seal against the wellbore tubular; and 3) subjecting the displacement plug to a wellbore fluid, thereby forming an expanded displacement plug fixed in the wellbore tubular, the expanded displacement plug including a cement plug body.

C. A well system, the well system including: 1) a wellbore positioned in a subterranean formation; 2) a wellbore tubular positioned within the wellbore, an annulus existing between the wellbore tubular and the wellbore; 3) an expanded displacement plug fixed in the wellbore tubular, the expanded displacement plug including a cement plug body and one or more displacement features engaged with the cement plug body; and 4) cement positioned in the annulus.

D. A valve, the valve including: 1) a housing; 2) a sliding sleeve disposed in the housing and defining an annular flow path between the sliding sleeve and the housing, the sliding sleeve configured to move from a closed positioned closing the annular flow path to an open position opening the flow path; and 3) a plug member positioned within the annular flow path, the plug member comprising a metal configured to expand in response to hydrolysis to seal the annular flow path.

E. A method for sealing, the method including: 1) positioning a valve within a wellbore tubular, the valve including; a) a housing; b) a sliding sleeve disposed in the housing and defining an annular flow path between the sliding sleeve and the housing, the sliding sleeve configured to move from a closed positioned closing the annular flow path to an open position opening the flow path; and CO a plug member positioned within the flow path, the plug member comprising a metal configured to expand in response to hydrolysis to seal the annular flow path; 2) pumping cement within a wellbore tubular; and 3) subjecting the plug member to a reactive fluid, thereby forming an expanded metal plug member in the annular flow path.

F. A well system, the well system including: 1) a wellbore positioned in a subterranean formation; and 2) a valve positioned within the wellbore, the valve including; a) a housing; b) a sliding sleeve disposed in the housing and defining an annular flow path between the sliding sleeve and the housing, the sliding sleeve configured to move from a closed positioned closing the annular flow path to an open position opening the flow path; and c) an expanded metal plug member positioned within the annular flow path, the expanded metal plug member comprising a metal that has expanded in response to hydrolysis to seal the annular flow path.

Aspects A, B, C, D, E, and F may have one or more of the following additional elements in combination: Element 1: wherein the plug body includes a nose, wherein at least a portion of the nose comprises the metal configured to expand in response to hydrolysis. Element 2: wherein the nose includes a nose nut, the nose nut comprising the metal configured to expand in response to hydrolysis. Element 3: wherein the nose includes a tubular, the tubular comprising the metal configured to expand in response to hydrolysis. Element 4: wherein the nose includes a lock ring, the lock ring comprising the metal configured to expand in response to hydrolysis. Element 5: wherein the nose includes an O-ring. Element 6: wherein the plug body is a casing displacement plug body. Element 7: wherein the plug body is a drill pipe displacement plug body. Element 8: wherein the one or more displacement features are one or more displacement fins. Element 9: wherein the one or more displacement fins are coupled to the plug body. Element 10: wherein the displacement plug further includes one or more displacement features engaged with the plug body. Element 11: wherein pumping fluid within the wellbore tubular includes pumping cement within the wellbore tubular. Element 12: wherein the one or more displacement fins are coupled to the cement plug body. Element 13: wherein the wellbore tubular is a landing collar. Element 14: wherein the landing collar is a landing collar of a shoe track. Element 15: wherein the shoe track includes a float collar and a float shoe. Element 16: wherein the landing collar is wellbore casing. Element 17: wherein the landing collar is a wet shoe sub having a sliding sleeve disposed therein, the sliding sleeve configured to slide to open a flow path below the plug body. Element 18: further including one or more plug members positioned within the flow path, the plug member comprising a metal configured to expand in response to hydrolysis to seal the flow path. Element 19: wherein the plug member is configured to be protected from reactive fluid when the sliding sleeve is in the closed position and configured to be exposed to the reactive fluid when the sliding sleeve is in the open position. Element 20: wherein the plug member is a first plug member, and further including a second plug member positioned within the flow path, the second plug member comprising the metal configured to expand in response to hydrolysis. Element 21: wherein the housing and the sliding sleeve form at least a portion of a wet shoe sub. Element 22: further including a displacement plug positioned within the sliding sleeve. Element 23: wherein the displacement plug includes: a plug body for landing in the sliding sleeve, wherein at least a portion of the plug body comprises a metal configured to expand in response to hydrolysis to seal against the wellbore tubular; and one or more displacement fins coupled to the plug body for displacing the plug body downhole. Element 24: wherein the subjecting occurs after the sliding sleeve has been moved from the closed position to the open position. Element 25: wherein the reactive fluid is drilling fluid. Element 26: wherein the reactive fluid is cement slurry. Element 27: wherein the housing and the sliding sleeve form at least a portion of a wet shoe sub. Element 28: wherein the expanded metal plug member fixes the sliding sleeve in the open position. Element 29: wherein the housing and the sliding sleeve form at least a portion of a wet shoe sub. Element 30: further including a displacement plug located within the sliding sleeve, and further wherein the displacement plug includes a plug body landed in the sliding sleeve, and one or more displacement fins coupled to the plug body for displacing the plug body downhole.

Those skilled in the art to which this application relates will appreciate that other and further additions, deletions, substitutions and modifications may be made to the described embodiments.

What is claimed is:

1. A valve, comprising:
   a housing;
   a sliding sleeve disposed in the housing and defining an annular flow path between the sliding sleeve and the housing, the sliding sleeve configured to move from a closed positioned closing the annular flow path to an open position opening the flow path; and
   a plug member positioned within the annular flow path, the plug member comprising a metal configured to expand in response to hydrolysis to seal against the housing and the sliding sleeve and occlude the annular flow path.

2. The valve as recited in claim 1, wherein the plug member is configured to be protected from reactive fluid when the sliding sleeve is in the closed position and configured to be exposed to the reactive fluid when the sliding sleeve is in the open position.

3. The valve as recited in claim 1, wherein the plug member is a first plug member, and further including a second plug member positioned within the flow path, the second plug member comprising the metal configured to expand in response to hydrolysis.

4. The valve as recited in claim 1, wherein the housing and the sliding sleeve form at least a portion of a wet shoe sub.

5. The valve as recited in claim 1, further including a displacement plug positioned within the sliding sleeve.

6. The valve as recited in claim 5, wherein the displacement plug includes:
   a plug body for landing in the sliding sleeve, wherein at least a portion of the plug body comprises a metal configured to expand in response to hydrolysis to seal against the wellbore tubular; and
   one or more displacement fins coupled to the plug body for displacing the plug body downhole.

7. The valve as recited in claim 6, wherein the plug body includes a nose, wherein at least a portion of the nose comprises the metal configured to expand in response to hydrolysis.

8. The valve as recited in claim 7, wherein the nose includes a nose nut, the nose nut comprising the metal configured to expand in response to hydrolysis.

9. The valve as recited in claim 7, wherein the nose includes a tubular, the tubular comprising the metal configured to expand in response to hydrolysis.

10. The valve as recited in claim 7, wherein the nose includes a lock ring, the lock ring comprising the metal configured to expand in response to hydrolysis.

11. A method for sealing, comprising:
    positioning a valve within a wellbore tubular, the valve including;
    a housing;

a sliding sleeve disposed in the housing and defining an annular flow path between the sliding sleeve and the housing, the sliding sleeve configured to move from a closed positioned closing the annular flow path to an open position opening the flow path; and a plug member positioned within the flow path, the plug member comprising a metal configured to expand in response to hydrolysis to seal against the housing and occlude the annular flow path;

pumping cement within a wellbore tubular; and subjecting the plug member to a reactive fluid, thereby forming an expanded metal plug member that seals against the housing and the sliding sleeve and occludes the annular flow path.

12. The method as recited in claim 11, wherein the subjecting occurs after the sliding sleeve has been moved from the closed position to the open position.

13. The method as recited in claim 11, wherein the reactive fluid is drilling fluid.

14. The method as recited in claim 11, wherein the reactive fluid is cement slurry.

15. The method as recited in claim 11, wherein the housing and the sliding sleeve form at least a portion of a wet shoe sub.

16. A well system, comprising:

a wellbore positioned in a subterranean formation; and a valve positioned within the wellbore, the valve including;

a housing;

a sliding sleeve disposed in the housing and defining an annular flow path between the sliding sleeve and the housing, the sliding sleeve configured to move from a closed positioned closing the annular flow path to an open position opening the flow path; and an expanded metal plug member positioned within the annular flow path, the expanded metal plug member comprising a metal that has expanded in response to hydrolysis to seal against the housing and the sliding sleeve and occlude the annular flow path.

17. The well system as recited in claim 16, wherein the expanded metal plug member fixes the sliding sleeve in the open position.

18. The well system as recited in claim 16, wherein the housing and the sliding sleeve form at least a portion of a wet shoe sub.

19. The well system as recited in claim 16, further including a displacement plug located within the sliding sleeve, and further wherein the displacement plug includes a plug body landed in the sliding sleeve, and one or more displacement fins coupled to the plug body for displacing the plug body downhole.

20. The well system as recited in claim 16, wherein the plug body includes a nose, wherein at least a portion of the nose comprises expanded metal that has expanded in response to hydrolysis.

21. The well system as recited in claim 20, wherein the nose includes a nose nut, wherein at least a portion of the nose nut comprises expanded metal that has expanded in response to hydrolysis.

22. The well system as recited in claim 20, wherein the nose includes a tubular wherein at least a portion of the tubular comprises expanded metal that has expanded in response to hydrolysis.

23. The well system as recited in claim 20, wherein the nose includes a lock ring, wherein at least a portion of the lock ring comprises expanded metal that has expanded in response to hydrolysis.

24. A valve, comprising:

a housing;

a sliding sleeve disposed in the housing and defining an annular flow path between the sliding sleeve and the housing, the sliding sleeve configured to move from a closed positioned closing the annular flow path to an open position opening the flow path; and a plug member positioned within the annular flow path and in contact with the sliding sleeve, the plug member comprising a metal configured to expand in response to hydrolysis to seal against the housing and the sliding sleeve and occlude the annular flow path.

* * * * *

UNITED STATES PATENT AND TRADEMARK OFFICE
CERTIFICATE OF CORRECTION

| | | |
|---|---|---|
| PATENT NO. | : 12,421,823 B2 | Page 1 of 1 |
| APPLICATION NO. | : 18/338538 | |
| DATED | : September 23, 2025 | |
| INVENTOR(S) | : Luke William Holderman and Brandon Thomas Least | |

It is certified that error appears in the above-identified patent and that said Letters Patent is hereby corrected as shown below:

In the Specification

In Column 7, Line 5, after --diameters-- delete "(Do)" and insert --($D_n$)--

In Column 7, Line 7, delete "(Do)" and insert --($D_n$)--

Signed and Sealed this
Fourth Day of November, 2025

John A. Squires
*Director of the United States Patent and Trademark Office*